United States Patent
Cobb et al.

(10) Patent No.: US 8,280,153 B2
(45) Date of Patent: Oct. 2, 2012

(54) VISUALIZING AND UPDATING LEARNED TRAJECTORIES IN VIDEO SURVEILLANCE SYSTEMS

(75) Inventors: Wesley Kenneth Cobb, The Woodlands, TX (US); Bobby Ernest Blythe, Houston, TX (US); David Samuel Friedlander, Houston, TX (US); Rajkiran Kumar Gottumukkal, Houston, TX (US); Ming-Jung Seow, Houston, TX (US); Gang Xu, Katy, TX (US)

(73) Assignee: Behavioral Recognition Systems, Houston, TX (US)

( * ) Notice: Subject to any disclaimer, the term of this patent is extended or adjusted under 35 U.S.C. 154(b) by 538 days.

(21) Appl. No.: 12/543,242

(22) Filed: Aug. 18, 2009

(65) Prior Publication Data
US 2011/0044498 A1    Feb. 24, 2011

(51) Int. Cl.
*G06K 9/00* (2006.01)
(52) U.S. Cl. .................. 382/155; 382/103
(58) Field of Classification Search .............. 382/103, 382/155
See application file for complete search history.

(56) References Cited

U.S. PATENT DOCUMENTS

| | | |
|---|---|---|
| 4,679,077 A | 7/1987 | Yuasa et al. |
| 5,113,507 A | 5/1992 | Jaeckel |
| 5,748,775 A | 5/1998 | Tsuchikawa et al. |
| 5,751,378 A | 5/1998 | Chen et al. |
| 5,969,755 A | 10/1999 | Courtney |
| 6,252,974 B1 | 6/2001 | Martens et al. |
| 6,263,088 B1 | 7/2001 | Crabtree et al. |
| 6,570,608 B1 | 5/2003 | Tserng |
| 6,661,918 B1 | 12/2003 | Gordon et al. |
| 6,674,877 B1 | 1/2004 | Jojic et al. |
| 6,678,413 B1 | 1/2004 | Liang et al. |
| 6,856,249 B2 | 2/2005 | Strubbe et al. |
| 6,940,998 B2 | 9/2005 | Garoutte |
| 7,076,102 B2 | 7/2006 | Lin et al. |
| 7,136,525 B1 | 11/2006 | Toyama et al. |
| 7,158,680 B2 | 1/2007 | Pace |
| 7,200,266 B2 | 4/2007 | Ozer et al. |
| 7,227,893 B1 | 6/2007 | Srinivasa et al. |
| 7,436,887 B2 | 10/2008 | Yeredor et al. |
| 7,623,677 B2 * | 11/2009 | Girgensohn et al. .......... 382/103 |
| 7,825,954 B2 | 11/2010 | Zhang et al. |

(Continued)

FOREIGN PATENT DOCUMENTS
WO   2009049314 A2   4/2009

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Vikkram Bali
(74) *Attorney, Agent, or Firm* — Patterson & Sheridan, LLP

(57) ABSTRACT

Techniques are disclosed for visually conveying a trajectory map. The trajectory map provides users with a visualization of data observed by a machine-learning engine of a behavior recognition system. Further, the visualization may provide an interface used to guide system behavior. For example, the interface may be used to specify that the behavior recognition system should alert (or not alert) when a particular trajectory is observed to occur.

24 Claims, 7 Drawing Sheets

U.S. PATENT DOCUMENTS

| | | | |
|---|---|---|---|
| 7,864,980 B2 * | 1/2011 | Evans | 382/103 |
| 7,868,912 B2 | 1/2011 | Venetianer et al. | |
| 7,957,560 B2 * | 6/2011 | Otsu et al. | 382/104 |
| 2003/0107650 A1 | 6/2003 | Colmenarez et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0165386 A1 | 7/2006 | Garoutte | |
| 2006/0190419 A1 | 8/2006 | Bunn et al. | |
| 2006/0222206 A1 | 10/2006 | Garoutte | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |
| 2011/0211070 A1 * | 9/2011 | Shu et al. | 348/143 |

OTHER PUBLICATIONS

Helmut Grabner et al., "On-line Boosting and Vision," IEEE Conference on Computer Vision and Pattern Recognition (CVPR),Jun. 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, Jun. 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, Dec. 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

VISUALIZING AND UPDATING LEARNED TRAJECTORIES IN VIDEO SURVEILLANCE SYSTEMS

BACKGROUND OF THE INVENTION

1. Field of the Invention

Embodiments of the invention provide techniques for conveying information learned by surveillance systems. More specifically, embodiments of the invention relate to techniques for visualizing and updating learned trajectories in surveillance systems.

2. Description of the Related Art

Some currently available video surveillance systems provide simple object recognition capabilities. For example, a video surveillance system may be configured to classify a group of pixels (referred to as a "blob") in a given frame as being a particular type of object (e.g., a person or vehicle). Once identified, a "blob" may be tracked frame-to-frame in order to follow the "blob" moving through the scene over time, e.g., a person walking across the field of vision of a video surveillance camera. Further, such systems may be configured to determine when an object has engaged in certain predefined behaviors.

However, such surveillance systems typically require that the objects and/or behaviors which may be recognized by the system to be defined in advance. Thus, in practice, these systems rely on predefined definitions for objects and/or behaviors to evaluate a video sequence. In other words, unless the underlying system includes a description for a particular object or behavior, the system is generally incapable of recognizing that behavior (or at least instances of the pattern describing the particular object or behavior). Thus, what is "normal" (acceptable) or "abnormal" (unacceptable) behavior needs to be defined in advance, and separate software products need to be developed to recognize additional objects or behaviors. This results in surveillance systems with recognition capabilities that are labor intensive and prohibitively costly to maintain or adapt for different specialized applications. Accordingly, currently available video surveillance systems are typically unable to recognize new patterns of behavior that may emerge in a given scene or recognize changes in existing patterns. More generally, such systems are often unable to identify objects, events, behaviors, or patterns as being "normal" or "abnormal" by observing what happens in the scene over time; instead, such systems rely on static patterns defined in advance.

SUMMARY OF THE INVENTION

One embodiment of the invention includes a computer-implemented method of generating a display of information learned by a video surveillance system. The method may generally include receiving a request to view a trajectory map for a scene depicted in a sequence of video frames captured by a video camera; retrieving a background image associated with the scene; retrieving trajectories associated with one or more foreground objects depicted in the sequence of video frames, wherein each trajectory plots a path traversed by a respective foreground object in moving through the scene; and superimposing a visual representation of each retrieved trajectory over the background image at a location corresponding to the path traversed by the respective foreground object in moving through the scene.

Another embodiment of the invention includes a computer-readable storage medium containing a program which, when executed by one or more computer processors, performs an operation of generating a display of information learned by a video surveillance system. The operation may generally include receiving a request to view a trajectory map for a scene depicted in a sequence of video frames captured by a video camera; retrieving a background image associated with the scene; retrieving trajectories associated with one or more foreground objects depicted in the sequence of video frames, wherein each trajectory plots a path traversed by a respective foreground object in moving through the scene; and superimposing a visual representation of each retrieved trajectory over the background image at a location corresponding to the path traversed by the respective foreground object in moving through the scene.

Still another embodiment includes a system having one or more computer processors and a memory containing a program, which, when executed by the one or more computer processors is configured to perform an operation of generating a display of information learned by a video surveillance system. The operation may generally include receiving a request to view a trajectory map for a scene depicted in a sequence of video frames captured by a video camera; retrieving a background image associated with the scene; retrieving trajectories associated with one or more foreground objects depicted in the sequence of video frames, wherein each trajectory plots a path traversed by a respective foreground object in moving through the scene; and superimposing a visual representation of each retrieved trajectory over the background image at a location corresponding to the path traversed by the respective foreground object in moving through the scene.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
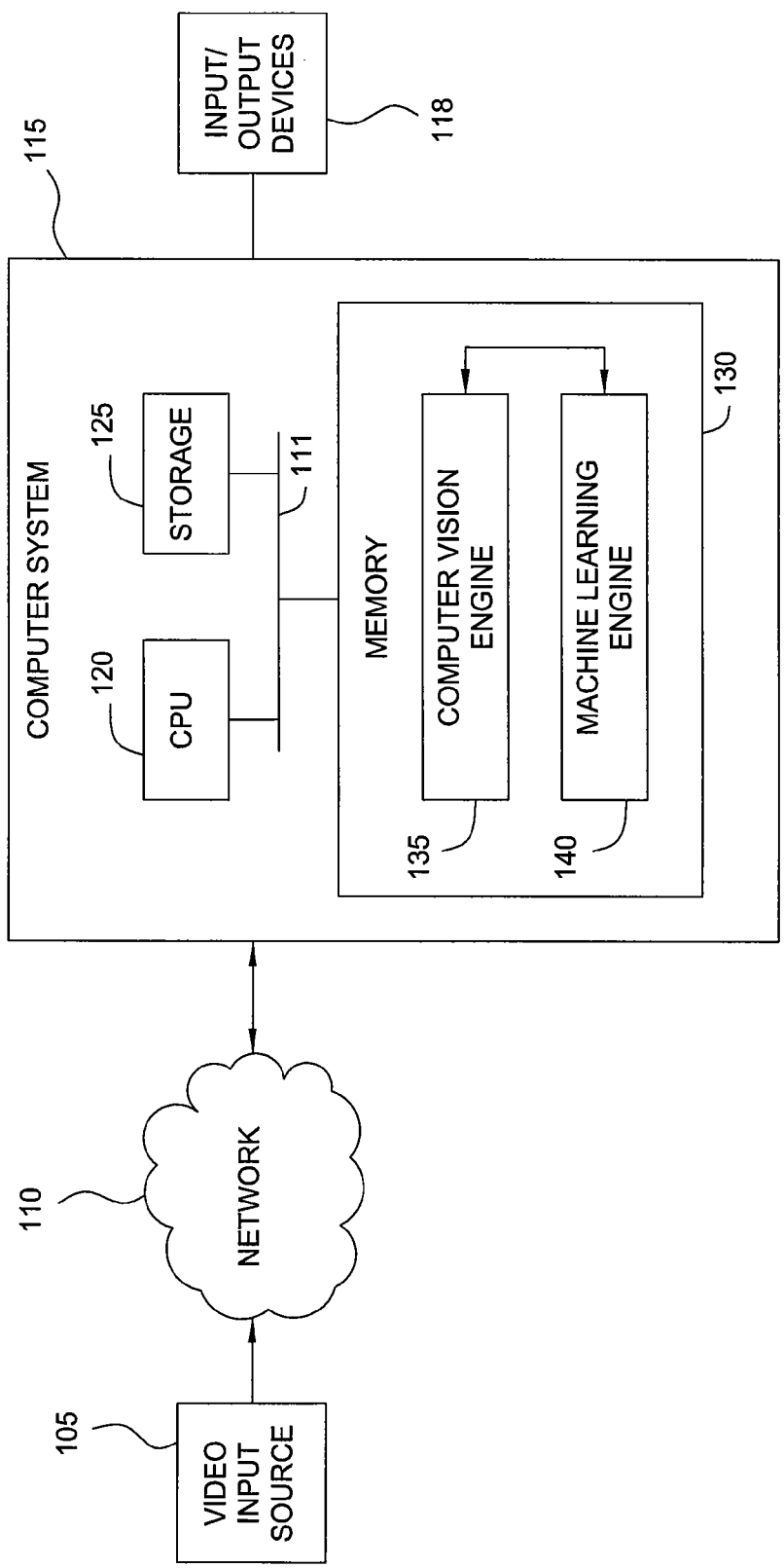
FIG. 1 illustrates components of a video analysis and behavior-recognition system, according to one embodiment of the invention.

Embodiments of the invention provide an interface configured to visually convey information learned by a behavior-recognition system. The behavior-recognition system may be configured to identify, learn, and recognize patterns of behavior by observing and evaluating events depicted by a sequence of video frames. In a particular embodiment, the behavior-recognition system may include both a computer vision engine and a machine learning engine. The computer vision engine may be configured to receive and evaluate a stream of video frames. Typically, each frame of video may be characterized using multiple color channels (e.g., a radiance value between 0-255 and a set of red, green, and blue (RGB) color channels values, each between 0-255). Further, the computer vision engine may generate a background image by observing the scene over a number of video frames. For example, consider a video camera trained on a stretch of a highway. In such a case, the background would include the roadway surface, the medians, any guard rails or other safety devices, and traffic control devices, etc., that are visible to the camera. Vehicles traveling on the roadway (and any other person or thing engaging in some activity) that are visible to the camera would represent scene foreground objects.

The computer vision engine may compare the pixel values for a given frame with the background image and identify objects as they appear and move about the scene. Typically, when a region of the scene (referred to as a "blob" or "patch") is observed with appearance values that differ substantially from the background image, that region is identified as depicting a foreground object. Once identified, the object may be evaluated by a classifier configured to determine what is depicted by the foreground object (e.g., a vehicle or a person). Further, the computer vision engine may identify features (e.g., height/width in pixels, average color values, shape, area, and the like) used to track the object from frame-to-frame. Further still, the computer vision engine may derive a variety of information while tracking the object from frame-to-frame, e.g., position, current (and projected) trajectory, direction, orientation, velocity, acceleration, size, color, and the like. In one embodiment, the computer vision outputs this information as a stream of "context events" describing the information related to each foreground object detected in the video frames.

Data output from the computer vision engine may be supplied to the machine learning engine. In one embodiment, the machine learning engine may evaluate the context events to generate "primitive events" describing object behavior. Each primitive event may provide some semantic meaning to a group of one or more context events. For example, assume a camera records a car entering a scene, and that the car turns and parks in a parking spot. In such a case, the computer vision engine could initially recognize the car as a foreground object; classify it as being a vehicle, and output kinematic data describing the position, movement, speed, etc., of the car in the context event stream. In turn, a primitive event detector could generate a stream of primitive events from the context event stream such as "vehicle appears," "vehicle turns," "vehicle slowing," and "vehicle stops" (once the kinematic information about the car indicated a speed of 0). As events occur, and re-occur, the machine learning engine may create, encode, store, retrieve, and reinforce patterns representing the events observed to have occurred, e.g., long-term memories representing a higher-level abstraction of a car parking in the scene—generated from the primitive events underlying multiple observations of different cars entering and parking. Further still, patterns representing an anomalous event (relative to prior observation) or events identified as an event of interest may result in alerts passed to users of the behavioral recognition system.

In one embodiment, the machine learning engine may include a transaction server and a GUI tool, one or both of which may be configured to generate a trajectory map for a scene. The transaction server and the GUI tool allow users to: (i) explore data learned by the machine learning engine and (ii) supply metadata specifying how the system should respond to certain observed events and/or behaviors (for example, when to produce (or not produce) an alert). For example, a user may supply metadata to override a default system behavior of alerting on novel or rare events and/or not alerting on frequently-occurring events. In one embodiment, the transaction server may receive a request to view a trajectory map for a specified scene. The trajectory map represents the trajectories for objects in the scene, as observed by the computer vision engine. The transaction server may generate a visual representation of trajectories superimposed over a background model. The background model provides an image of the scene expected when the background is visible to the camera. Once generated, the trajectory map may be presented on a graphical display. In one embodiment, the transaction server may also receive a user request to add (or remove) metadata for one of the trajectories. For example, a user may specify to name a trajectory, to always alert on a trajectory, ignore a trajectory, to modify a property of a trajectory, etc.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

The computer vision engine 135 may be configured to analyze this raw information to identify active objects in the video stream, classify the objects, derive a variety of metadata regarding the actions and interactions of such objects, and supply this information to a machine learning engine 140. In turn, the machine learning engine 140 may be configured to evaluate, observe, learn and remember details regarding events (and types of events) that transpire within the scene over time.

In one embodiment, the machine learning engine 140 receives the video frames and the data generated by the computer vision engine 135. The machine learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI screen. In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 analyzes each frame in real-time to derive a set of information about what is occurring within a given frame, the machine learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application running on another computer system may request (or receive) the results of over network 110.

Figure 2:
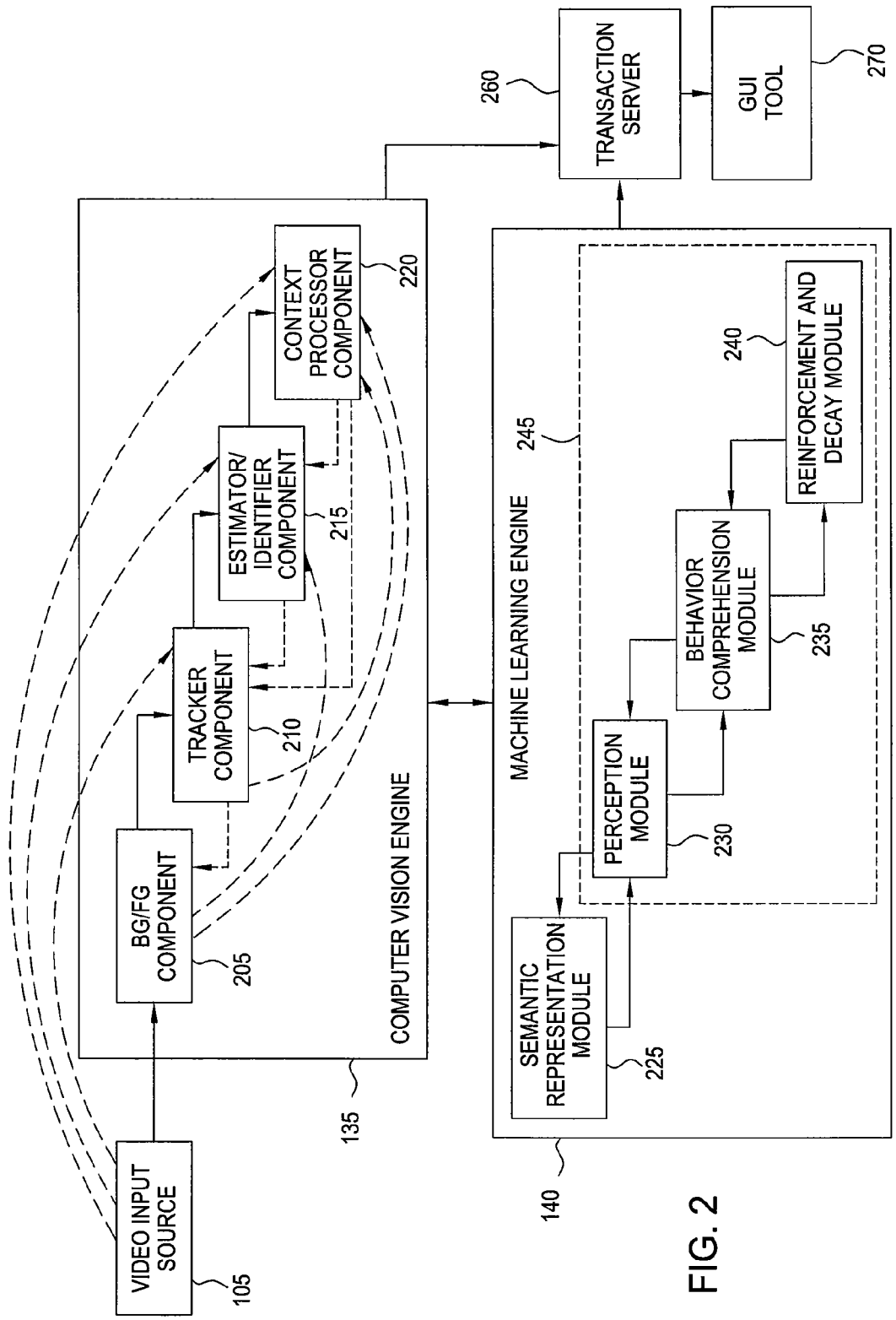
FIG. 2 illustrates components of a computer vision engine and of a machine learning engine, according to one embodiment of the invention.

FIG. 2 further illustrates components of the computer vision engine 135 and the machine learning engine 140 first illustrated in FIG. 1, according to one embodiment of the present invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows). In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channel or radiance channel for black and white video). The BG/FG component 205 may be configured to generate a mask used to identify which pixels of the scene have been determined to depict foreground and, conversely, which pixels have been determined to depict scene background. The BG/FG component 205 then identifies regions of the scene that contain a portion of scene foreground (referred to as a foreground "blob" or "patch") and supplies this information to subsequent stages of the pipeline. Additionally, portions of the scene determined to depict scene background maybe used to update pixel values in a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene. In one embodiment, once the tracker discovers an object (depicted by a foreground patch), the tracker may continue tracking the object even if pixels of the object are not continuously reported as foreground.

The estimator/identifier component 215 may receive the output of the tracker component 210 (and the BF/FG component 205) and classify each tracked object as being one of a known category of objects. For example, in one embodiment, estimator/identifier component 215 may classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting) or an indication of whether the person is carrying an object. In an alternative embodiment, the machine learning engine 140 may classify foreground objects observed by the vision engine 135. For example, the machine-learning engine 140 may include an unsupervised classifier configured to observe and ultimately classify actors in a scene based on a plurality of micro-features (e.g., size, speed, appearance, etc.).

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and classified (by estimator identifier component 215). For example, the context processor component 220 may evaluate a foreground object from frame-to-frame and output context events describing that object's height, width (in pixels), position (as a 2D coordinate in the scene), acceleration, velocity, orientation angle, etc.

Additionally, the context processor component 220 may be configured to identify a trajectory for an object observed in a scene. Generally, a trajectory describes the path of an object (represented by a group of pixels over a sequence of frames) from when the object first appears in the scene to when it leaves the scene, e.g., pixels depicting a car traversing a field of view of a camera, or a person appearing in the scene and disappearing when entering a car or a subway vehicle (or vice versa). The actual trajectory may be represented by a sequence of spatial coordinate positions (x,y) in the scene from frame-to-frame. In such a case, a geometric center of pixels depicting an object may be used to select a coordinate value for a horizontal and vertical positions for each frame in which the object appears.

The computer vision engine 135 may take the outputs of the components 205, 210, 215, and 220 describing the motions and actions of the tracked objects in the scene and supply this data to the machine learning engine 140. In one embodiment, the machine learning engine 140 employs two models for recognizing, analyzing, and learning behaviors: namely, a semantic model and a cognitive model. Based on the data provided by the computer vision engine 135, the semantic model generates semantic descriptions (representations) of what is depicted in the video stream including semantic descriptions (representations) of objects/subjects and their actions. In other words, the semantic model labels data with semantic meaning as to what is observed in the scene. In turn, the cognitive model may be configured to observe patters associated with a given event; update a pattern (i.e., a memory) representing a given event; reinforcing long-term memories associated with an event; develop "memories" representing new patterns of behavior; and create new semantic labeling to apply to new patterns of behavior. As stated, in one embodiment, new patterns of behavior may be generated as a combination of known patterns. In such a case, the semantic labeling applied to a new behavior may represent a combination of the labels applied to patterns in that new behavior.

Thus, the cognitive model may simulate some aspects of a human brain, e.g., how the human brain perceives abstract concepts, reasons about them, recognizes behaviors, and learns new concepts. In one embodiment, the cognitive model may employ a neuro-semantic network that includes a combination of a semantic representation module 225 and a cognitive model 245. Each of these components is described in greater detail below. The neuro-semantic network may include a plurality of nodes representing semantic concepts (i.e., a neural net). As is known, a neural net may be used to represent simple concepts using a single node (e.g., a vehicle or its kinematic characteristic). Further, the neural net may represent complex concepts using multiple nodes that links together multiple concepts (e.g., motor-vehicle accident). The neuro-semantic network may include several levels, where the lowest level describes a collection of primitive events. Higher levels of the neuro-semantic network may describe complex concepts, which are created by combining primitive concepts. Typically, the higher the level of complexity, the more complex concepts it defines. In one embodiment, the neuro-semantic network may provide increasing levels of complexity where the primitives for one level of complexity are combined to form a primitive for the next level of complexity, and so on. Data provided to the cognitive model may be used to excite nodes of the neuro-semantic network, allowing behaviors to be recognized and the network itself to be updated. Updates may include creating nodes, updating nodes, deleting nodes or modifying or creating links between nodes.

In one embodiment, the semantic representation module 225 receives data describing objects/subjects detected in a scene from the computer vision engine 135. Such data may include identification data, posture, location, trajectory, velocity, acceleration, direction, and other quantitative characteristics that describe an object identified in the scene by the computer vision engine 135. In one embodiment, based on data received from the computer version engine 135, the semantic representation module 225 forms two semantic streams: namely, a primitive event symbol stream and a phase-space symbol stream. The primitive event symbol stream includes semantic (i.e., symbolic) descriptions of primitive events recognized in the scene and objects participating in such primitive events (e.g., "vehicle stops," "human turns," etc.). The phase-space partitioning stream includes semantic descriptions, i.e., phase-space symbols, of values of quantitative characteristics of an object (e.g., a symbol "a" indicating that an object was located in a certain area of the scene or a symbol "x" indicating that an object's velocity is within a certain range, and so on). Thus, the phase-space symbol stream associated with a given object may provide a trajectory of motion for that object throughout the scene. The semantic representation module 205 may generate formal language vectors based on the trajectories of a given object by combining relative data from the primitive event and phase-space symbol streams. In one embodiment, the formal language vectors are used to describe both semantic and quantitative aspects of behavior observed to have occurred within a scene.

As shown, the cognitive model 245 includes a perception module 230, a behavior comprehension module 235, and reinforcement and decay module 240. In general, the perception module 230 analyzes data provided by the semantic representation module 225, learns patterns, generalizes based on observations, and learns by making analogies. In one embodiment, the perception module 230 may include multiple memories such as a perceptual memory, an episodic memory, and a long-term memory. Based on the incoming data, the perception module 230 may perceive multi-level concepts (structures), such as a percept. As used herein a "percept" represents a combination of nodes (and links between nodes) representing an action and/or associated actor(s); trajectories, i.e., sequences of percepts; and clusters of trajectories. That is, a percept may be defined as a subgraph of a neural net that includes each node (and links between node) relevant for a particular identified behavior. Thus, percepts may represent behaviors perceived by the machine learning engine to have occurred. More complex behaviors may be represented as combinations of percepts. As described in greater detail below, perceived concepts and corresponding memories may be stored in a workspace and processed by various codelets. In one embodiment, a codelet provides an active, typically independent, process (agent) that includes executable code. Generally, a codelet may evaluate percepts and relationships between percepts to recognize behaviors and other events important to the system (e.g., a parking event), build new structures based using analogies (e.g., combine two similar percepts into a higher level node), detect anomalies (e.g., by comparing percepts to long-term memory content), look for expected events/behaviors, and so on.

In one embodiment, the perception module 230 may be further configured to determine whether the computer vision engine 135 has misclassified an object. For example, if the perception module 230 determines that the computer vision engine has repeatedly applied particular classification to an object (e.g., a car) and then classifies this same object as something else (e.g., a person), the perception module 230 may inform the computer vision 135 of a probable misclassification.

In general, the behavior comprehension module 235 recognizes behaviors and responds to recognized behaviors. For this purpose, the behavior comprehension module 235 further analyzes structures placed in the workspace. As the presence of given percepts are broadcast to other components of the cognitive model 245, multiple internal and external actions may be performed. For example, internal actions may include updating and/or generalizing procedures and concepts, models and events, creating new concepts and procedures, generating expectation structures/procedures, and so on. In one embodiment, external actions may include issuing a signal (e.g., alarm) responsive to recognized (or unrecognized) behavior, providing feedback to other components of the behavior-recognition system 100 (such as the semantic representation module 225, the computer-vision engine 135, etc.), adjusting camera operations, and so on. The feedback may include data regarding the observed events/behaviors needed to modify the behavior-recognition system to better recognize the events/behaviors in the future.

In general, the reinforcement and decay module 240 reinforces memories of repeatedly occurring behaviors and decays and/or eliminates memories of occasionally occurring behaviors. More specifically, percepts, and associated nodes, may decay over time if not used or alternatively, may be reinforced if used. Thus, for example, when a structure, such as a percept, is placed into the workspace similar memories may be reinforced (or updated to better generalize the behavior represented by the memory). In this manner, a competitive learning environment is created where useful percepts, and associated nodes, survive because they are reinforced, and non-useful, percepts, and associated nodes, decay away.

In one embodiment, the machine learning engine 140 receives data describing the objects detected in the scene by the computer vision engine 135. As discussed above, such data may include dynamic and kinematic characteristics of an object (e.g., time, position, velocity, etc.), identification information, classification information, object trajectories and so on. Further, the data may be received in a generally real-time stream as the computer vision engine 135 processes a video stream, frame-by-frame.

In one embodiment, the received data is used to generate create two data streams: a primitive event symbol stream and a phase-space symbol stream. The primitive event symbol stream includes semantic representations of the detected primitive events. For example, a stream of primitive events related to behavior the computer vision engine "sees" as a vehicle parking could include "vehicle appears," "vehicle moves," "vehicle turns," and "vehicle stops." The phase-space symbol stream includes symbolic representations of values of objects/subjects' quantitative characteristics, such as location, time, velocity, and so on. For example a phase-space symbol stream corresponding to the primitive event stream of the example above may be the following: "a, c, f, k," where each of the symbols corresponds to a region of the scene where a particular primitive event took place, i.e., the vehicle appeared in area "a," moved through area "c," turned in area "f," and stopped in area "k." Though, the provided example includes only one object, i.e., the vehicle, each stream typically includes similar information describing other objects/subjects detected in the scene. Alternatively, multiple pairs of primitive event and phase-space symbol streams may be generated, namely a pair of streams for each detected object/subject.

As noted above, as an object (or more specifically, patches of pixels believed to depict the object from frame to frame) moves around the scene, the computer vision engine 135 generates a trajectory along a path of movement of that object. In one embodiment, such a trajectory may be used to organize semantic representations, which relate to one object into one entity, referred to as a "formal language vector." At step 320, data from the primitive event and phase-space symbol streams related to each object having a complete trajectory is combined and converted to generate respective formal language vectors. The vector representations, along with the primitive event streams may be passed to a perceptual memory. For example, the formal language vectors may be passed to the cognitive model 225 of the machine-learning engine 140 for analysis.

Typically, a trajectory begins at the location where an object first appears in the scene, continues while the object moves about the scene, and is completed when that object disappears from the scene. In one embodiment, the trajectory may be considered to be complete when an object/subject stops moving for a long period of time (e.g., if a car arrived into a parking lot, a trajectory of the car is completed when the car parks and stays parked for a period of time). A period of time may be defined, for example, by a number of video frames. Further, in one embodiment, the appropriate amount of time may be "learned" by the system as a matter of observation. Accordingly, a trajectory may also begin when an object/subject that has been motionless for a period of time starts moving. In another embodiment, a trajectory is not completed if an object/subject disappears from the scene only temporarily (e.g., an object passes behind a background object such as a tree). If after such a temporary disappearance, the object continues to be identified as the same object, its trajectory continues until the object fully disappears from the scene, or alternatively, stops for a period of time. Note, although a trajectory, as described above, is defined in terms of an object appearing in or disappearing from the scene, a trajectory may also be defined in different terms. Such terms could depend on, for example, the particular characteristics of the observed environment and/or the requirements of a particular case. For example, in one embodiment, a trajectory may be defined in terms of time (e.g., trajectory occupies a pre-defined number of video frames).

As described above, a codelet may be configured to analyze and process data placed into the workspace to recognize, interpret, and analyze behaviors observed by the behavior-recognition system 100. When multiple codelets are available for activation, a codelet that is activated to run its particular task may be picked randomly (or semi-randomly). The selected codelet may be configured to apply model based reasoning, logic based reasoning, and reasoning by analogy to information copied to the workspace to recognize behaviors and/or other events. Further, in one embodiment, codelets may build new structures, such as combine two or more percepts into a complex concept, and/or supply their own structures and name the newly created structures. The name for a higher level concept may be determined, e.g., by combining labels of the combined structures.

One type of codelet may be configured to determine whether an anomaly has occurred. For example, an "anomaly detector" codelet may analyze data in the workspace to compare current observations in the scene with patterns stored in long-term memory. If such a codelet determines that differences are significant, an anomaly event/behavior may be identified. In one embodiment, trajectories in the scene and associated data are saved in a support vector machine (SVM). As is known, an SVM treats input data as two sets of vectors in an n-dimensional space. The SVM constructs a hyperplane that separates the two sets of vectors in the n-dimensional space. Further, the hyperplane may be constructed to maximize a margin between the two sets of vectors. For example, the SVM may construct a hyperplane to separate trajectories into "normal" trajectories and "anomalous" trajectories for a given environment. In one embodiment, the "anomaly detector" codelet may use such data, along with corresponding output from the SVM, to determine whether a currently observed trajectory is "normal" for that environment. In another embodiment, a codelet for sampling velocity and acceleration evaluates velocity and acceleration data and determines their distributions for each type of trajectory objects (e.g., velocity and acceleration distributions are likely to differ for a vehicle and a human). After statistically sufficient distribution samples are collected, currently observed data may be compared against such distributions to determine whether the currently detected speeds and/or velocities of the tracked objects are "normal."

In one embodiment, e.g., the SVM may evaluate trajectories using a pool storing a configurable number of recently observed trajectories. For example, a pool of the last 100 trajectories may be used to train the SVM. Further, multiple batches (e.g., the last five batches). Thereafter, subsequently observed trajectories may be classified as being anomalous (or not) by the SVM, relative to the training set. Further, the pool itself may be updated (and the SVM retrained) after each 50 new trajectories are available. This approach avoids retraining the SVM with each new trajectory, while still allowing the SVM to adapt to changes in object behavior. Of course, the number of trajectories used to train/update the SVM may be tailored to suit the available computing resources and other needs of a particular case and other approaches to training the SVM may be used (as well as other approaches for classifying a particular trajectory as being normal or anomalous).

In one embodiment, the transaction server 260 may receive a request to view a trajectory map for a specified scene. The trajectory map includes a visual representation of trajectories for objects that have been observed in the scene. The map may include trajectories for a group objects classified as depicting a particular type of object (e.g., a trajectories of vehicles or persons) or trajectories of multiple object types. Of course, the trajectory map may present trajectories for individual objects as well. Further, the trajectory map may also present the results of SVM analysis. For example, the trajectory map may distinguish between trajectories labeled anomalous by the SVM (relative to other observed trajectories). Further still, the visualization may provide a composite trajectory. A composite trajectory refers to a trajectory composed from the observations of multiple individual trajectories. For example, a composite trajectory may represent an average or generalized path followed by the multiple objects (or cars, etc.) observed to enter and leave the scene. In such a case, the transaction server 260 could superimpose a composite of all trajectories classified as normal by the SVM over the background model, while also superimposing each individual trajectory classified as being anomalous.

Note, however, the transaction server 260 is shown as a separate component from the machine learning engine 140 for reasons of clarity. In an alternative embodiment, the functions provided by the transaction server 260 may be integrated with the machine learning engine 140. Further still, trajectory data provided for display via the GUI tool 270 may be generated directly by components of the computer vision engine 135 and/or the machine learning engine 140. Of course, one of ordinary skill in the art will recognize that the functions of the transaction server 260 may be implemented in a variety of ways.

As noted, the transaction server 260 may be configured to generate a visual representation of one or more trajectories superimposed over the background model to generate a trajectory map for the specified scene. Doing so allows users to view the path an object (or group of objects) took in traversing through the scene as well as understand which trajectories were classified as anomalous. Further, the transaction server 260 may also receive a user request to modify metadata associated with one of the trajectories presented in the trajectory map. For example, a user may specify a name for trajectory, define a rule specifying to always (or never) alert on a when a particular trajectory is observed, or modify a property of a trajectory, etc. Table I shows examples of transactions that may be supported by the transaction server 260:

TABLE I

Transactions Supported by the Transaction Server

| Transaction | Description |
| --- | --- |
| Get preset list | Obtain a list of presets for a specified camera |
| Get scene image | Obtain a picture that represents a scene as viewed by the camera |
| Get trajectory data | Obtain trajectory data for a specified preset |
| Set always alert | Specifies to always alert on a match for a specified trajectory |
| Set always ignore | Specifies to never alert on a match for a specified trajectory |
| Modify property | Modify a property of a specified trajectory |

Figure 3:
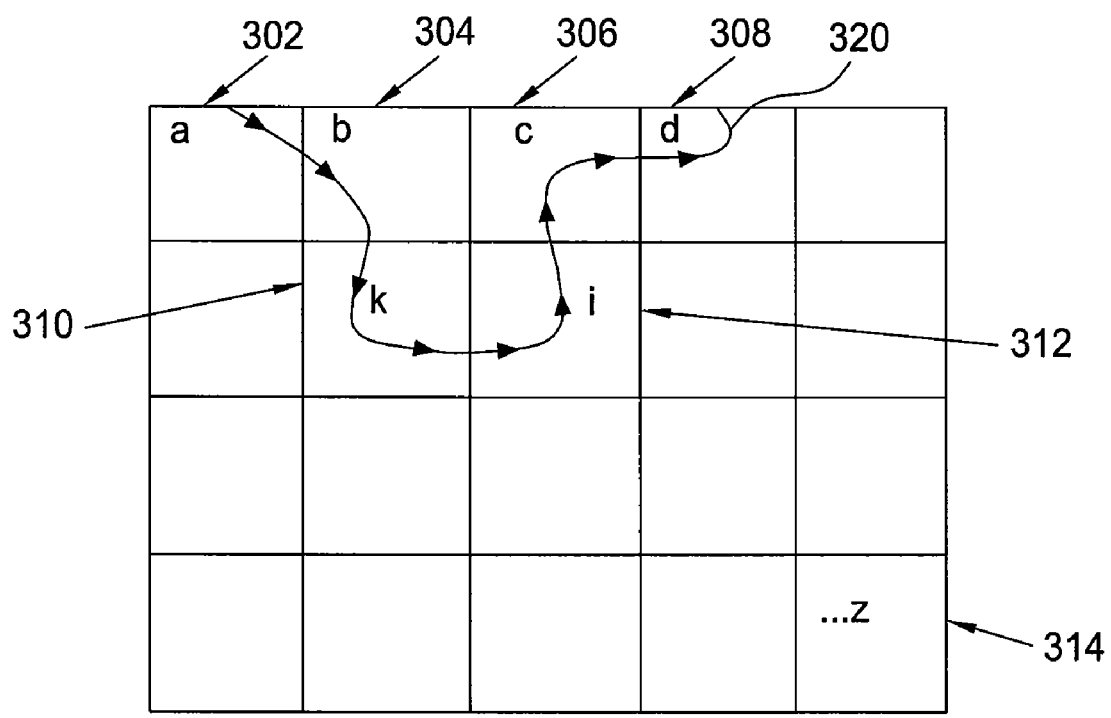
FIG. 3 illustrates a trajectory of an object through a phase-space domain, according to one embodiment of the invention.

FIG. 3 illustrates a trajectory of an object through a phase-space domain, according to one embodiment of the invention. As described above, the computer vision engine 135 may be configured to provide the machine-learning engine 140 with data regarding observed objects in the scene, e.g., quantitative characteristics, such as speed, acceleration, location, direction, time, and the like. The values for each such characteristic create a corresponding domain of values for that quantitative characteristic (e.g., location domain may include each pixel of the scene, or alternatively, selected parts of the scene; speed domain may include possible speed value for a specific kind of the object, such as vehicle, human, etc., or alternatively, any other kind of the object/subject and so on).

In one embodiment, quantitative characteristic domains (e.g., a location domain) are partitioned and assigned a unique symbol. For example, FIG. 3 illustrates a phase-space domain, i.e., the location domain 300, which includes every pixel depicting the scene. Multiple partitions, such as partitions 302, 304, 306, 308, 310, 312, and 314, are created and assigned unique symbols. Illustratively, the partition 302 is assigned symbol "a," the partition 304 is assigned symbol "b," and so on. In one embodiment, the domain partitions are simply created by dividing the domain area into approximately equal parts (e.g., location domain' partitions containing the same number of pixels and similarly shaped). In another embodiment, partitioning of the domain may be based on specific characteristics of a scene (e.g., location domain having separate partitions for each parking space in a parking lot).

As an object moves around the scene, quantitative characteristic values change. If such domains are partitioned and the partitions are assigned unique symbols (thus, forming phase-space domains), the movement of the object through each of the domains may be characterized by a phase-space symbol string. For example, FIG. 3 shows a trajectory 320 corresponding to an object moving through the scene with the following phase-space symbol string: [a, b, k, k, i, i, c, c, d], where each symbol is determined frame-by-frame, based on the object/subject's location in the scene. Note however, while FIG. 3 illustrates partitioning the location domain, domains of other quantitative characteristics may be partitioned in a similar manner.

Figure 4:
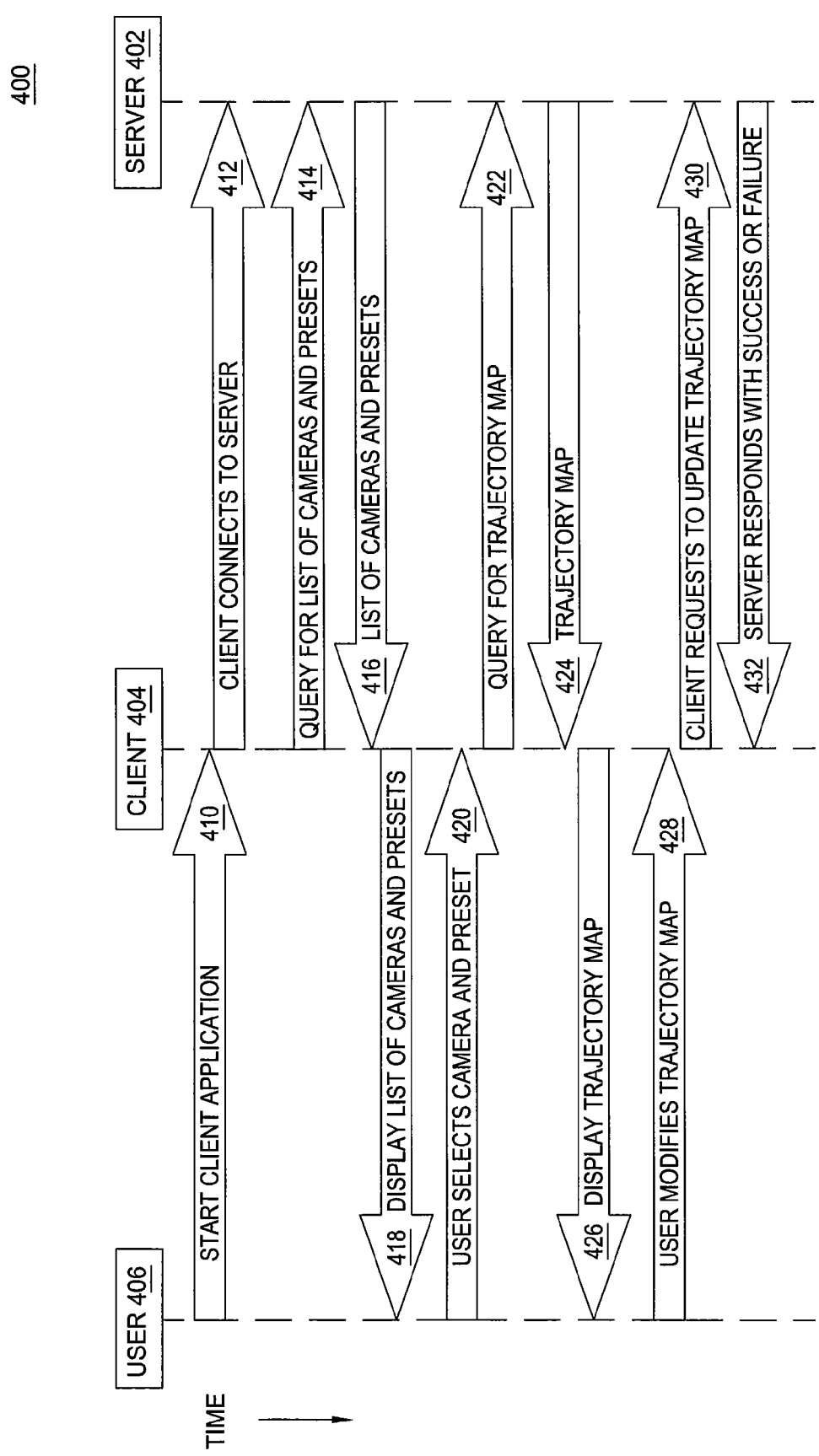
FIG. 4 illustrates a method for a server application to interact with a client application to visually convey a trajectory map, according to one embodiment of the invention.

FIG. 4 illustrates a method 400 for a server application 402 to interact with a client application 404 to visually convey a trajectory map to a user 406 using the client 404, according to one embodiment of the invention. In one embodiment, the server 402 may be the machine learning engine 140 of FIG. 2. In one embodiment, the server 404 may listen for client requests on a specified port (e.g., via Berkeley sockets application programming interface (API) using Transmission Control Protocol/Internet Protocol (TCP/IP)). Further, the client 404 and the server 402 may communicate using any application-layer network protocol such as Hypertext Transfer Protocol (HTTP), File Transfer Protocol (FTP), or Simple Object Access Protocol (SOAP). Further still, each request to and/or response from the server 402 may be in a format such as Extensible Markup Language (XML).

As shown, the method 400 begins at step 410, where the user 406 invokes the client 404. At step 412, the client 404 connects to the server 402. For example, the client 404 may connect to a specified IP address and port number on which the server 402 is listening. At step 414, the client 404 queries for a list of cameras and associated presets 416. Each preset may include a location and orientation of a respective camera observing (or having observed) a scene. At step 416, the server 402 returns a list of cameras and presets to the client 404. At step 418, the client 404 displays the list of cameras and presets to the user 406.

At step 420, the user 406 selects a camera and a preset. The client 404 then queries for a trajectory map from the server 402 for the selected camera and preset (step 422). At step 424, the server 402 returns the trajectory map to the client 404. In another embodiment, the user need not select a camera and/or a preset. For example, the server 402 may be configured to return a trajectory map for a currently active scene. At step 426, the client 404 displays the trajectory map to the user 406 (e.g., via a graphical display). The trajectory map may include one or more trajectories superimposed on a background model for a scene corresponding to the selected camera and preset.

Further, the client 404 may allow the user 406 to select one or more trajectories shown on trajectory map. The client 404 may also display properties associated with a selected trajectory. Examples of such properties include an identifier for the trajectory, a label of the trajectory, a location of the trajectory in the scene, a size of the trajectory, identifiers for ancestors of the trajectory, alert preferences for the trajectory, etc. Ancestors of a trajectory refer to two or more trajectories that are merged to form the trajectory. The client 404 may also allow the user 406 to modify one or more properties for a trajectory. For example, a user 406 may modify a label or display properties for a trajectory to customize how the trajectory map conveys information for a particular trajectory. Accordingly, at step 428, the user 406 modifies the displayed trajectory map via the client 404. For example, the user 406 may modify a property of a trajectory in the displayed trajectory map. At step 430, the client 404 sends a request to the server 402 to update the trajectory map. In one embodiment, the server 402 may treat each client request as a separate transaction. At step 432, the server 402 updates the trajectory map and returns a result to the client 404 indicating success or failure of the update. After the step 532, the method 400 terminates.

Figure 5:
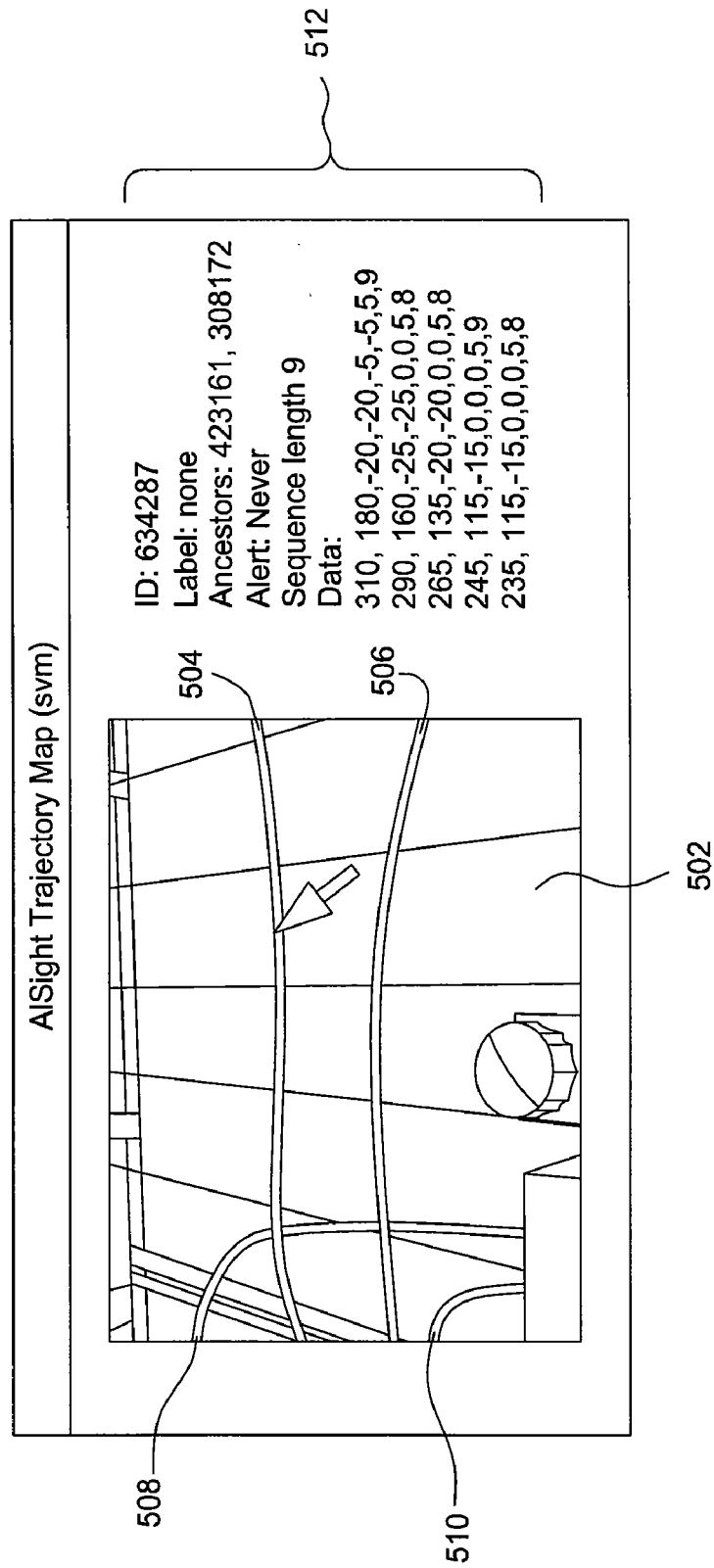
FIG. 5 illustrates a graphical user interface (GUI) for visually conveying a trajectory map, according to one embodiment of the invention.

FIG. 5 illustrates a GUI 500 showing an example of a trajectory map, according to one embodiment of the invention. As shown, the GUI 500 includes a trajectory map 502 and properties 512 associated with a selected trajectory. The trajectory map 502 includes trajectories 504, 506, 508, 510, which are shaded differently from one another. For example, a trajectory having a darker shading may represent a more anomalous trajectory (e.g., as determined by the SVM) than a trajectory having a lighter shading. Further, the trajectory 504 is shown as being selected by the user. Thus, the properties 512 are associated with the selected trajectory 504 and include an identifier for the trajectory 504 (i.e., 634287), a label for the trajectory 504 (i.e., "none"), identifiers for ancestors of the trajectory (i.e., 423161, 308172), alert settings for the trajectory 504 (i.e., "Never"), a sequence length for the trajectory 504 (i.e., 9), and data associated with the trajectory. In this example, a user may assign a label for the trajectory 504. The user may also set the trajectory 504 to alert whenever the machine-learning engine determines that a series of primitive events matching this trajectory has occurred.

Figure 6:
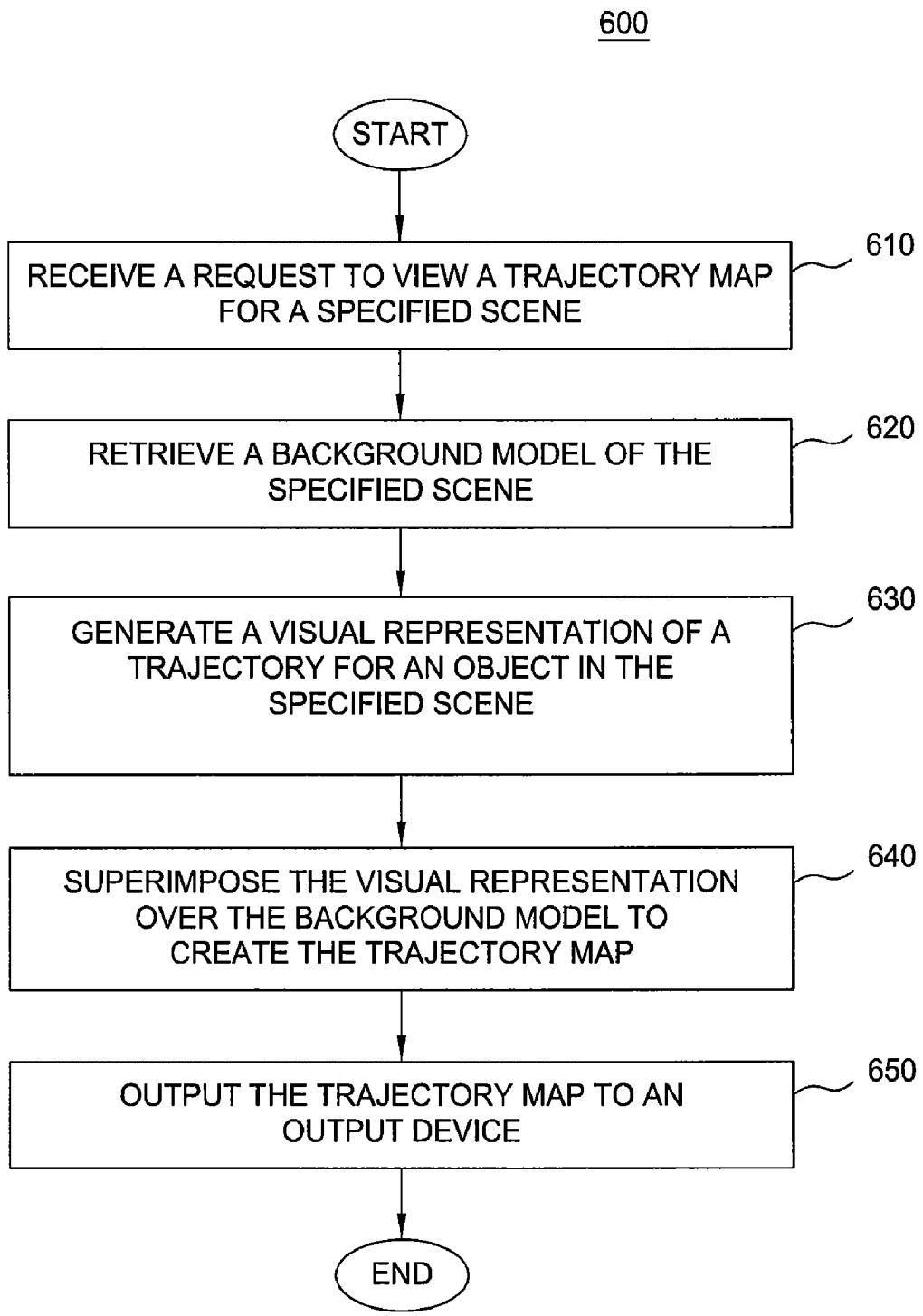
FIG. 6 illustrates a method for visually conveying a trajectory map, according to one embodiment of the invention.

FIG. 6 illustrates a method 600 for visually conveying a trajectory map, according to one embodiment of the invention. As shown, the method 600 begins at step 610, where the transaction server 260 receives a request to view a trajectory map for a specified scene. For example, a user may specify a camera and a preset for the camera for which the user desires to view the trajectory map. At step 620, the transaction server 260 retrieves a background model generated by the computer vision engine 135. As noted above, the background model may provide an image of a scene, where the color for each pixel represents a color value expected when the background of the scene is visible to a camera. At step 630, the transaction server 260 generates a visual representation of at least one trajectory for an object in a scene captured by a video camera. The trajectory of the object may represent a path of the object moving through the scene. Accordingly, the trajectory may identify pixels in the background image marking the path of the object. The pixels may be determined relative to the "center of mass" of the object as depicted by a foreground patch over a sequence of frames.

Further, the transaction server 260 may generate the visual representation for each trajectory using any available metadata. For example, the transaction server 260 may determine the size, transparency, orientation, fill color, border thickness, border color, pattern, label, and marking of the visual representation from values of properties of the respective trajectory (e.g., how anomalous the trajectory is determined to be, for a given environment). The visual representation may also identify the context events and/or primitive events related to a particular trajectory.

At step 640, the transaction server 260 may superimpose the visual representation over the background model to create the trajectory map. Further, the trajectory map allows the user to view and/or modify properties of any trajectory selected by the user. Modifying a property of a selected trajectory is described further in conjunction with FIG. 7. At step 650, the transaction server 260 presents the generated trajectory map on a graphical display. For example, the generated trajectory map may be displayed via the GUI tool 270. After the step 650, the method 600 terminates.

While embodiments of the invention are described herein with reference to the transaction server 260 generating the visual representation (and superimposing the visual representation over the background model to create the trajectory map), other embodiments are broadly contemplated. For example, the transaction server 260 may send the background model and raw data (from which the visual representation may be generated) to the GUI tool 270. The GUI tool 270 may then generate the visual representation from the raw data and superimpose the visual representation over the background model.

Figure 7:
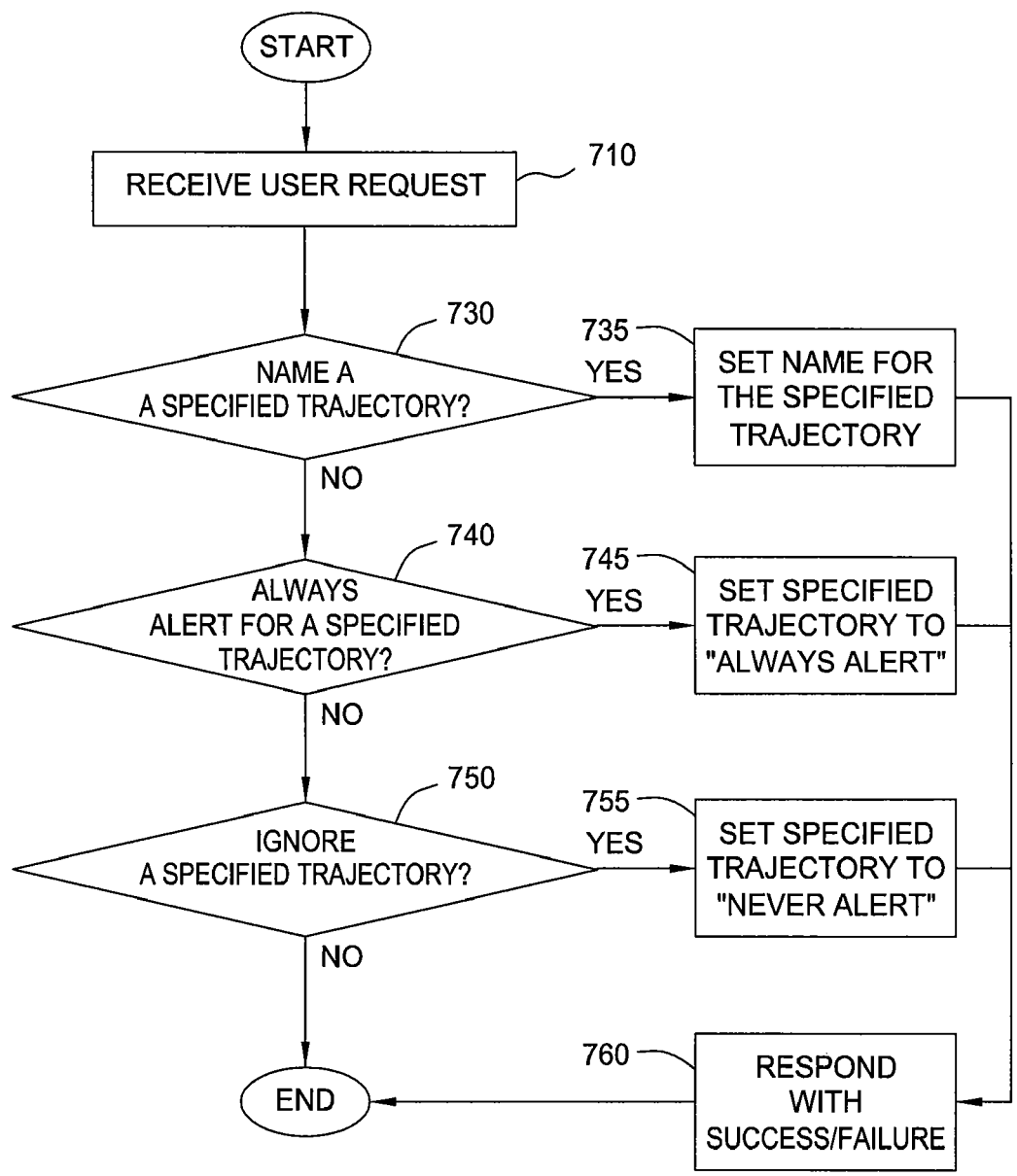
FIG. 7 illustrates a method for modifying trajectory metadata using a trajectory map, according to one embodiment of the invention.

FIG. 7 illustrates a method 700 for modifying trajectory metadata using a trajectory map, according to one embodiment of the invention. As shown, the method 700 begins at step 710, where the transaction server 260 receives a user request to modify the trajectory map. If the user request is to name a specified trajectory (step 730), the transaction server 260 sends the name to the machine-learning engine (step 735). If the user requests to always alert for a specified trajectory (step 740), then the transaction server 260 may send a message to the machine learning engine 140 specifying that any time an object trajectory matches the specified trajectory, an alert should be generated (step 745). Conversely, if the user requests to ignore a specified trajectory (step 750), the transaction server 260 may send a message to the machine-learning engine 140 may indicating that no alerts should be generated from the specified trajectory (step 755). Further, the user may also request to modify other properties associated with a trajectory. After steps 725, 735, 745, or 755, the machine-learning engine 140 may respond with a success or failure of servicing the user request (step 760). After the steps 750 or 760, the method 700 terminates.

Advantageously, embodiments of the invention provide users with a visualization of data observed by a machine-learning engine of a behavior recognition system. Further, the visualization may provide an interface used to guide system behavior. For example, the interface may be used to specify that the behavior recognition system should alert (or not alert) when a particular trajectory is observed to occur.

While the foregoing is directed to embodiments of the present invention, other and further embodiments of the invention may be devised without departing from the basic scope thereof, and the scope thereof is determined by the claims that follow.

What is claimed is:

1. A computer-implemented method of generating a display of information learned by a video surveillance system, comprising:
   receiving a request to view a trajectory map for a scene depicted in a sequence of video frames captured by a video camera;
   retrieving a background image associated with the scene;
   retrieving one or more trajectories associated with one or more foreground objects depicted in the sequence of video frames, wherein each trajectory plots a path traversed by a respective foreground object in moving through the scene; and
   superimposing a visual representation of each retrieved trajectory over the background image at a location corresponding to the path traversed by the respective foreground object in moving through the scene.

2. The computer-implemented method of claim 1, wherein a support vector machine classifies each retrieved trajectory as being anomalous or not anomalous, relative to trajectories of a plurality of foreground objects, and wherein the visual representation of identifies retrieved trajectories classified as being anomalous.

3. The computer-implemented method of claim 1, wherein the background image specifies a pixel value for each pixel expected to be observed in a frame of video captured by the video camera when scene background is visible to the video camera in a frame of video.

4. The computer-implemented method of claim 1, wherein the visual representation of each retrieved trajectory identifies pixels in the background image used to plot the path of the corresponding foreground object in moving through the scene.

5. The computer-implemented method of claim 1, wherein the identified pixels are determined relative to a geometric center of the foreground object, as depicted in each of a sequence of frames.

6. The computer-implemented method of claim 1, wherein at least one retrieved trajectory is a composite generated from multiple retrieved trajectories observed at the scene.

7. The computer-implemented method of claim 1, further comprising:
   receiving, as user input, metadata to associate with a first one of the retrieved trajectories, wherein the metadata is selected from at least: (i) a label to assign to occurrences the first trajectory observed in the sequence of video frames; (ii) an indication to generate an alert message each time the first trajectory subsequently observed; and (iii) an indication to not generate an alert message each time the first trajectory subsequently observed.

8. The computer-implemented method of claim 1, further comprising, receiving an indication of an object classification type, wherein the retrieved trajectories are associated with foreground objects classified as being an instance of the object classification type.

9. A non-transitory computer-readable medium containing a program which, when executed, performs an operation for generating a display of information learned by a video surveillance system, the operation comprising:
receiving a request to view a trajectory map for a scene depicted in a sequence of video frames captured by a video camera;
retrieving a background image associated with the scene;
retrieving one or more trajectories associated with one or more foreground objects depicted in the sequence of video frames, wherein each trajectory plots a path traversed by a respective foreground object in moving through the scene; and
superimposing a visual representation of each retrieved trajectory over the background image at a location corresponding to the path traversed by the respective foreground object in moving through the scene.

10. The non-transitory computer-readable medium of claim 9, wherein a support vector machine classifies each retrieved trajectory as being anomalous or not anomalous, relative to trajectories of a plurality of foreground objects, and wherein the visual representation of identifies retrieved trajectories classified as being anomalous.

11. The non-transitory computer-readable medium of claim 9, wherein the background image specifies a pixel value for each pixel expected to be observed in a frame of video captured by the video camera when scene background is visible to the video camera in a frame of video.

12. The non-transitory computer-readable medium of claim 9, wherein the visual representation of each retrieved trajectory identifies pixels in the background image used to plot the path of the corresponding foreground object in moving through the scene.

13. The non-transitory computer-readable medium of claim 9, wherein the identified pixels are determined relative to a geometric center of the foreground object, as depicted in each of a sequence of frames.

14. The non-transitory computer-readable medium of claim 9, wherein at least one retrieved trajectory is a composite generated from multiple retrieved trajectories observed at the scene.

15. The non-transitory computer-readable medium of claim 9, wherein the operation further comprises:
receiving, as user input, metadata to associate with a first one of the retrieved trajectories, wherein the metadata is selected from at least: (i) a label to assign to occurrences the first trajectory observed in the sequence of video frames; (ii) an indication to generate an alert message each time the first trajectory subsequently observed; and (iii) an indication to not generate an alert message each time the first trajectory subsequently observed.

16. The non-transitory computer-readable medium of claim 9, wherein the operation further comprises, receiving an indication of an object classification type, wherein the retrieved trajectories are associated with foreground objects classified as being an instance of the object classification type.

17. A system, comprising:
a video camera;
one or more computer processors; and
a memory containing a program, which, when executed by the one or more computer processors, performs an operation for generating a display of information, the operation comprising:
receiving a request to view a trajectory map for a scene depicted in a sequence of video frames captured by the video camera,
retrieving a background image associated with the scene,
retrieving one or more trajectories associated with one or more foreground objects depicted in the sequence of video frames, wherein each trajectory plots a path traversed by a respective foreground object in moving through the scene, and
superimposing a visual representation of each retrieved trajectory over the background image at a location corresponding to the path traversed by the respective foreground object in moving through the scene.

18. The system of claim 17, wherein a support vector machine classifies each retrieved trajectory as being anomalous or not anomalous, relative to trajectories of a plurality of foreground objects, and wherein the visual representation of identifies retrieved trajectories classified as being anomalous.

19. The system of claim 17, wherein the background image specifies a pixel value for each pixel expected to be observed in a frame of video captured by the video camera when scene background is visible to the video camera in a frame of video.

20. The system of claim 17, wherein the visual representation of each retrieved trajectory identifies pixels in the background image used to plot the path of the corresponding foreground object in moving through the scene.

21. The system of claim 17, wherein the identified pixels are determined relative to a geometric center of the foreground object, as depicted in each of a sequence of frames.

22. The system of claim 17, wherein at least one retrieved trajectory is a composite generated from multiple retrieved trajectories observed at the scene.

23. The system of claim 17, wherein the operation further comprises:
receiving, as user input, metadata to associate with a first one of the retrieved trajectories, wherein the metadata is selected from at least: (i) a label to assign to occurrences the first trajectory observed in the sequence of video frames; (ii) an indication to generate an alert message each time the first trajectory subsequently observed; and (iii) an indication to not generate an alert message each time the first trajectory subsequently observed.

24. The system of claim 17, wherein the operation further comprises, receiving an indication of an object classification type, wherein the retrieved trajectories are associated with foreground objects classified as being an instance of the object classification type.

* * * * *